(12) United States Patent
Lee et al.

(10) Patent No.: US 8,964,380 B2
(45) Date of Patent: Feb. 24, 2015

(54) MOBILE TERMINAL

(71) Applicant: LG Electronics Inc., Seoul (KR)

(72) Inventors: Juhun Lee, Seoul (KR); Donghan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 65 days.

(21) Appl. No.: 13/655,537

(22) Filed: Oct. 19, 2012

(65) Prior Publication Data

US 2013/0215558 A1   Aug. 22, 2013

(30) Foreign Application Priority Data

Feb. 16, 2012  (KR) ................. 10-2012-0015779

(51) Int. Cl.
| | |
|---|---|
| *G06F 1/16* | (2006.01) |
| *H05K 5/00* | (2006.01) |
| *H05K 7/00* | (2006.01) |
| *H01R 13/24* | (2006.01) |

(52) U.S. Cl.
CPC .......... *H01R 13/2442* (2013.01); *G06F 1/1656* (2013.01)
USPC ................................ 361/679.56; 361/679.01

(58) Field of Classification Search
CPC . H01Q 1/243; H04M 1/0274; H01R 13/2478; H01R 13/2442; H01R 12/57; H01R 2103/00; G06F 1/1656; G06F 1/1626
USPC .......................................... 361/679.01, 679.56
See application file for complete search history.

(56) References Cited

U.S. PATENT DOCUMENTS

| | | | | |
|---|---|---|---|---|
| 3,946,390 | A  * | 3/1976 | Alexander et al. ............ | 343/702 |
| 7,598,924 | B2 * | 10/2009 | Hynes et al. .................. | 343/906 |
| 7,830,331 | B2 * | 11/2010 | Yamazaki et al. ............ | 343/906 |
| 2001/0050647 | A1 | 12/2001 | Kanayama et al. ........... | 343/702 |
| 2009/0213030 | A1 | 8/2009 | Hynes et al. .................. | 343/906 |
| 2010/0039347 | A1 | 2/2010 | Chen et al. .................... | 343/873 |
| 2010/0221593 | A1* | 9/2010 | Huang .......................... | 429/100 |
| 2011/0026200 | A1* | 2/2011 | Dong ....................... | 361/679.01 |

OTHER PUBLICATIONS

European Search Report dated May 8, 2013 issued in Application No. 12 19 3674.

* cited by examiner

*Primary Examiner* — Bernard Rojas
(74) *Attorney, Agent, or Firm* — KED & Associates LLP (57) ABSTRACT

A mobile terminal has a connector which moves relative to a cover and case. The connector moves through a hole in the case to become electrically coupled to a circuit when the cover is coupled over the case. When the cover is removed, the connector moves to a second position relative to the hole and circuit. The circuit may be an antenna circuit coupled to the cover or another circuit at a different location. An area of the connector is greater than an area of the hole to prevent any components under the connector from being visible when viewed through the hole.

15 Claims, 7 Drawing Sheets

MOBILE TERMINAL

CROSS REFERENCE TO RELATED APPLICATIONS

Pursuant to 35 U.S.C. §119(a), this application claims the benefit of earlier filing date and right of priority to Korean Application No. 10-2012-0015779, filed on Feb. 16, 2012, the contents of which are hereby incorporated by reference herein in its entirety.

BACKGROUND

1. Field

One or more embodiments described herein relate to a mobile terminal.

2. Background

Mobile terminals perform a variety of functions to satisfy consumer demand. These functions include multimedia functions in the form of recording images and video, playing music and games, and receiving broadcasting or internet signals. Notwithstanding their ubiquitous appeal, mobile terminals have drawbacks that need to be addressed. These drawbacks include, for example, flaws that relate to hardware terminal and structural design, software operability, and communication and processing efficiency, just to name a few.

SUMMARY

In accordance with one embodiment, a mobile terminal has a structure that reduces visibility of and/or prevents electronic components of the terminal from being exposed during use.

In accordance with another embodiment, a mobile terminal is provided with has a connector terminal of reduced size which at the same time has an attractive and stylish design.

In accordance with another embodiment, a mobile terminal includes a case comprising a predetermine space formed therein to mount electronic parts therein; a terminal hole formed in the case; a connection clip comprising a middle portion curved in substantially a "C" shape and an first end and the second end extended along the same direction, the first end connected to the electronic parts and the second end covering the terminal hole within the case; and a connection terminal coupled to the second end of the connection clip, with being projected outside via the terminal hole, wherein the width of the terminal hole is larger than the width of the connection terminal and smaller than the width of the connection clip.

The terminal hole may be completely covered by the connection clip and the electronic parts in the case may not be exposed outside by the terminal hole.

Additionally, the mobile terminal may include a clip holder configured to limit a movement range of the connection clip and the connection terminal may be accessed to a near filed communication antenna.

DETAILED DESCRIPTION

Figure 1:
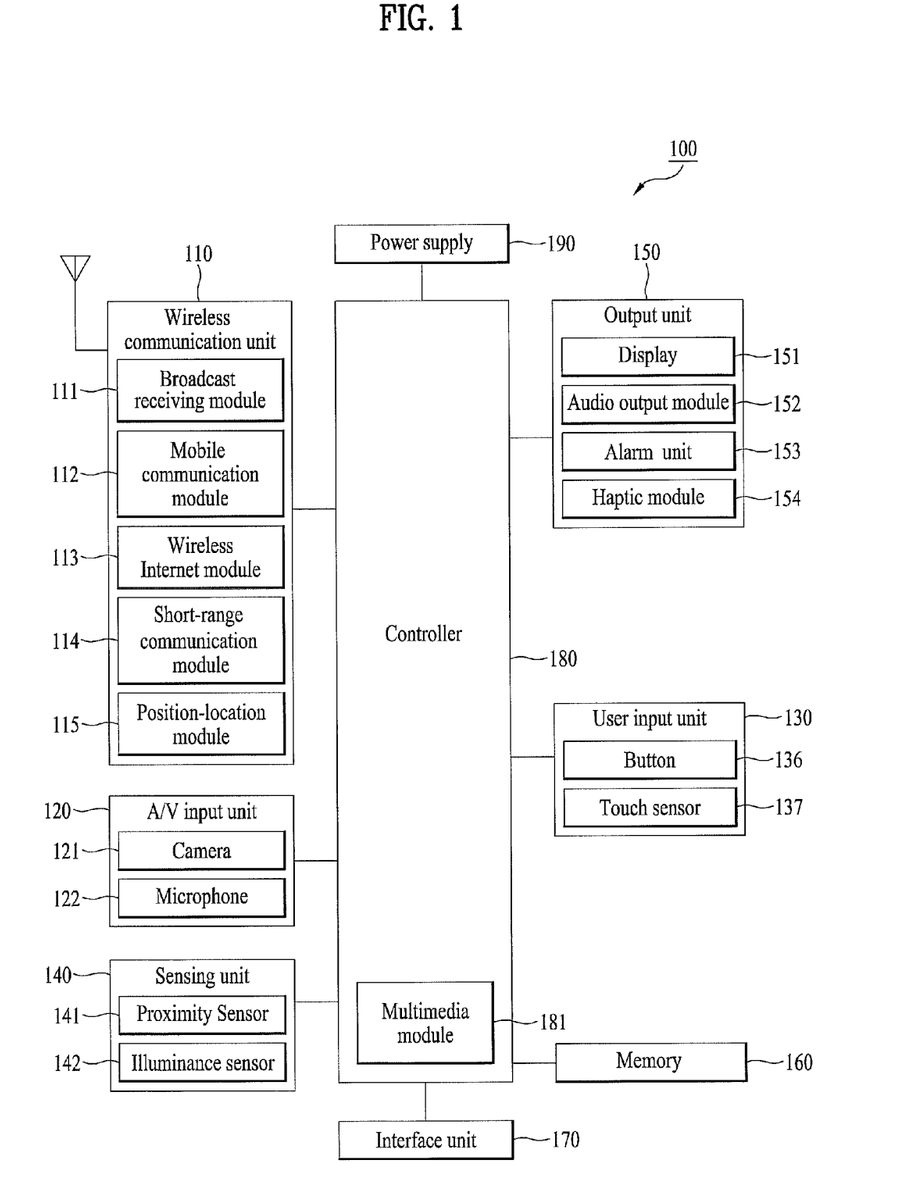
FIG. 1 shows one embodiment of a mobile terminal.

FIG. 1 is a block diagram of one embodiment of a mobile terminal 100. The mobile terminal may be, for example, a mobile phone, user equipment, smart phone, digital broadcast receiver, personal digital assistants, a pad- or pod-type device, a multimedia terminal, a navigation terminal, a laptop or notebook computer, a portable multimedia player (PMP), a camera or video recorder, or another electronic device.

As shown in FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190.

The wireless communication unit 110 may include one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, and/or a position-location module 115.

The broadcast receiving module 111 receives a broadcast signal and/or broadcast associated information from an external broadcast managing server via a broadcast channel.

The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text or multimedia messages, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LIE (Long Term Evolution) etc.

Wireless internet access by Wibro, HSPDA, GSM, CDMA, WCDMA, LIE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. The location and time information may be calculated using three satellites, and errors of the calculated location position and time information are then amended using another satellite. Besides, the GPS module 115 is able to calculate speed information by continuously calculating a real-time current location.

The audio/video (A/V) input unit 120 may be configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. The user input unit 130 may include a key pad 135, a button 136 located in a front, rear or lateral surface, a dome switch, a touch sensor (a capacitive/resistive type) 137, a jog wheel and a jog switch. Especially, when the touch sensor 137 and a display 151, which will be described later, form a mutual layer, it will be referenced to as 'touchscreen'.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor 137') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, the touch sensor may detect the pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

A proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

It will be referenced to as "proximity touch" that a pointer close to the touchscreen without contact with the touchscreen is recognized, as follows, and it will be referenced to as "contact touch" that a pointer substantially contacts with the touchscreen. The position where a pointer is proximity-touched on the touchscreen means the position of the touchscreen that is perpendicular to the pointer, when the pointer is proximity-touched.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as vibration. For instance, the haptic module 154 may generate the effect attributed to the arrangement of pins vertically moving against a contact skin surface, the effect attributed to the injection/suction power of air though an injection/suction hole, the effect attributed to a skim over a skin surface, the effect attributed to contact with an electrode, the effect attributed to electrostatic force, and/or the effect attributed to the representation of hold/cold sense using an first endothermic or exothermic device.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory), or other similar memory or data storage device. And, the mobile terminal 100 is able to operate in association with web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/ wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by various components of the mobile terminal 100. The power may be internal power, external power, or combinations thereof.

Also, the power supply 190 may include a battery, a connection port, a power supply controller and a charging monitor, for example. The battery may be an embedded battery that is rechargeable and it may be detachably fitted to a terminal body for charging or the like. An external charger for supplying an electric power to charge the battery may be electrically connected to the connection port that is an example of the interface 170.

The aforementioned features are provided as an exemplary description of the mobile terminal, with the understanding that other embodiments may have more, fewer, or different features.

Also, various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

Figure 2:
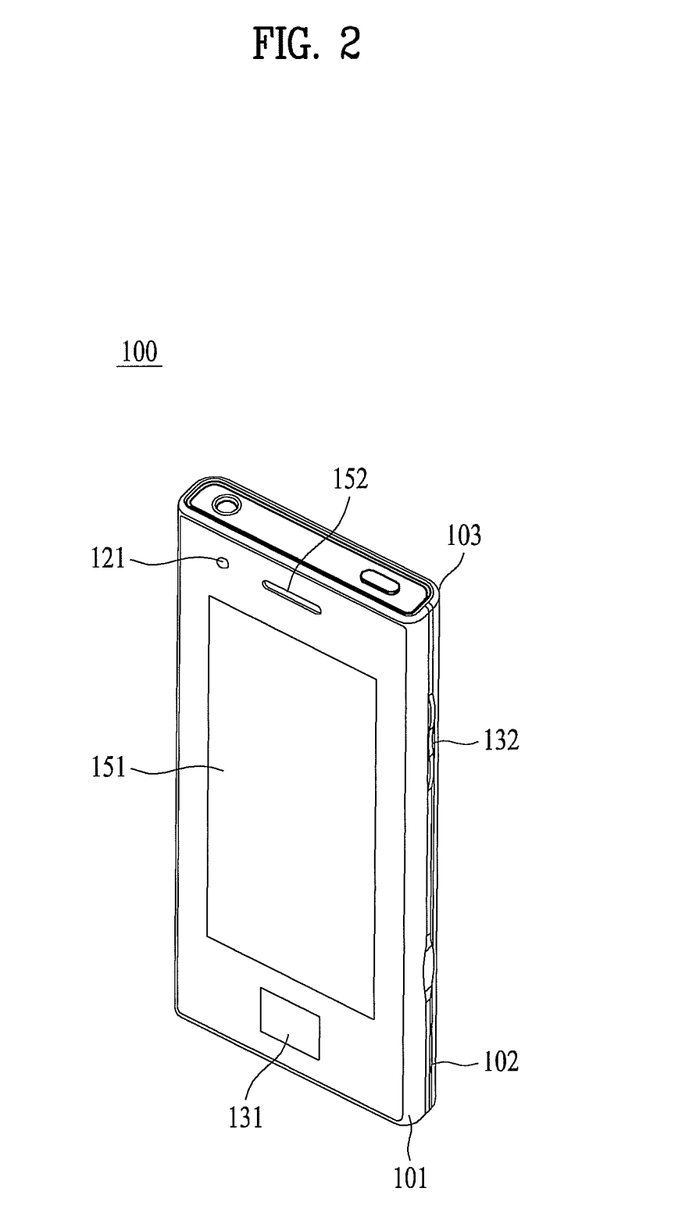
FIG. 2 shows one possible front view of the mobile terminal.

FIG. 2 shows one possible front view the mobile terminal of FIG. 1. As shown, the mobile terminal 100 in this drawing has a bar-type terminal body. In other embodiments, the mobile terminal 100 may have a different configuration. Examples of include a folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case which defines an outward appearance of the terminal. The case may include a front case 101, a rear case 102, and a rear cover 103. Various electronic parts are loaded in a space provided between the front and rear cases 101 and 102. The electronic parts embedded in the surface of the rear case 102 may include a battery, a USIM card and a memory card.

In this instance, the rear cover 103 may be provided to cover the surface of the rear case 102. The rear cover 103 may have a detachable structure such that the user may mount or demount the rear cover 103 easily. When the user demounts the rear cover 103, the surface of the rear case 102 is exposed.

As shown in FIG. 2, when the rear cover 103 is connected, only a predetermined portion of a lateral surface of the rear case 102 may be exposed. When the size of the rear cover 103 is decreased, a predetermined portion of a rear surface may be possessed by the rear case 102. When the rear cover 103 covers an entire surface of the rear case 102, an opening 103' may be formed to expose the camera 121' or the audio output unit 152' outside. (See FIG. 4).

The cases 101, 102 and 103 may be formed by injection molding of synthetic resin or can be formed of metal substance such as stainless steel (STS), titanium (Ti) or the like for example.

A display 151, an audio output unit 152, a camera 121, user input units 131 and 132, a microphone 122, an interface 180 and the like can be provided to the terminal body, and more particularly, to the front case 101 or 102.

The display 151 occupies most of a main face of the front case 101. The audio output unit 152 and camera 121 may be provided to an area adjacent to one end portion of the display 151, while the user input unit 131 and microphone 122 may be provided at or adjacent to an opposing end portion of the display 151. The user input unit 132 and the interface 170 can be provided to lateral sides of the front and rear cases 101 and 102.

The input units may be manipulated to receive commands for controlling operations of the terminal 100. In this embodiment, the input unit includes a plurality of manipulating units 131 and 132 which can be referred to as a manipulating portion and which may adopt any mechanism of a tactile manner that enables a user to perform a manipulation action by experiencing a tactile feeling. In other embodiments, one or more than two input units may be provided.

Content input by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

According to one embodiment, the manipulating units 131 and 132 may be button types that recognize a portion having the pressure applied thereto by the user. Touch sensors may be provided in the manipulating units 131 and 132, rather that the display 151, to receive the user's command only by the user's touch.

Figure 3:
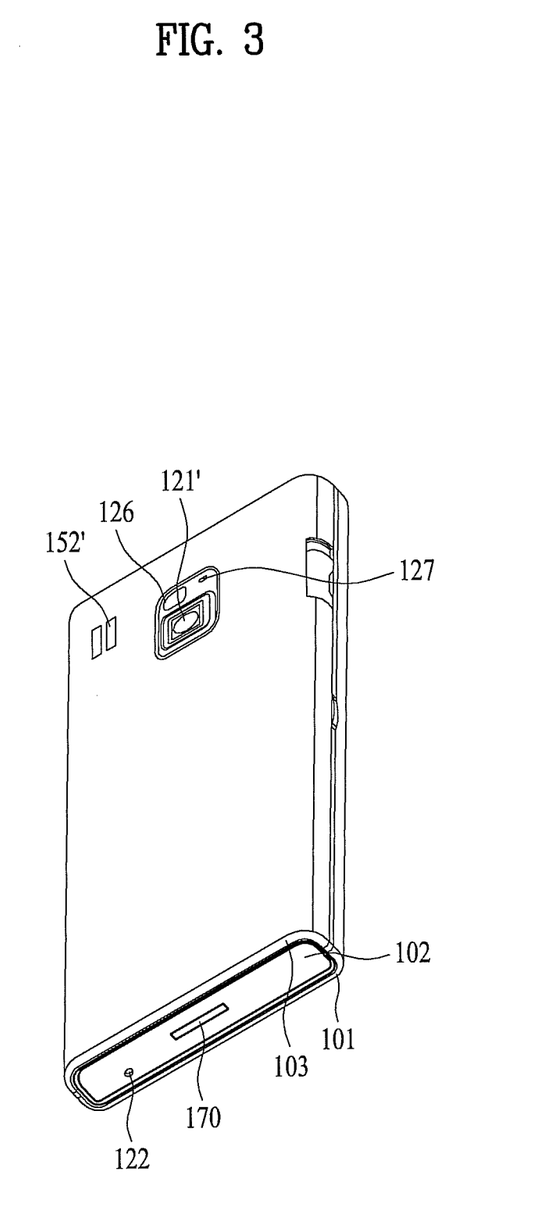
FIG. 3 shows one possible rear view of the mobile terminal.

FIG. 3 shows one possible rear view of the mobile terminal. In this view, an additional camera 121' is provided to a backside of the terminal body, and more particularly, to rear case 102. Camera 121' has a photographing direction that is substantially opposite to that of camera 121 in FIG. 2 and may have the same or a different pixel resolution as camera 121.

According to one example, camera 121 may have lower pixel resolution (e.g., a resolution sufficient to capture and transmit a picture of user's face for a video call), while camera 121' may have a relatively higher pixel resolution for capturing general subjects for photography and/or objects at greater distances. The cameras 121 and 121' may be installed at the terminal body so as to be rotated or popped up.

A flash 123 and a mirror 124 may be provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

Figure 4:
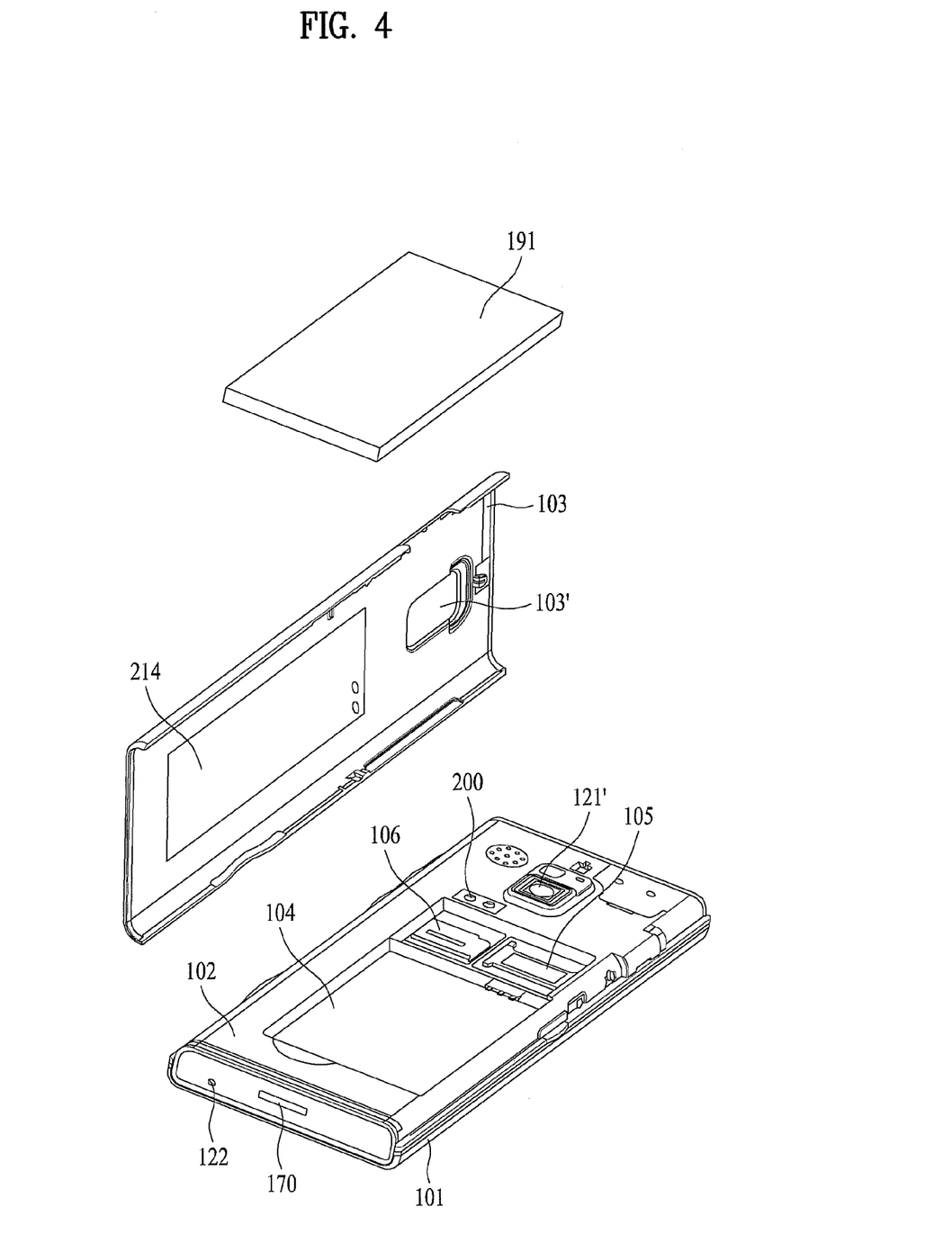
FIG. 4 shows a view of the mobile terminal with a rear cover removed.

FIG. 4 shows a view of the mobile terminal with the rear cover removed and surface of the rear case exposed. This view shows front case 101, rear case 102, rear cover 103 which may serve as a battery cover, camera 121', interface 170, microphone 122, speaker module 154, a battery 191, a battery mounting portion 104, a USIM card mounting portion 105, a memory card mounting portion 106, a short range communication antenna 214 and a connector unit 200.

The battery mounting portion 104, USIM card mounting portion 105 and memory card mounting portion 106 are provided in a surface of the rear case 102. As shown in FIG. 4, the USIM card mounting portion 105 or the memory card mounting portion 106 may be formed adjacent to the battery mounting portion 104 or in a bottom surface of the battery mounting portion 104. In operation, a user may separate the battery 191 from the battery mounting portion 104 for replacement, hard reboot, or for another reason. The size of the battery mounting portion 104 may be larger than the dimensions of the battery 191 in one embodiment.

The connector unit 200 includes a terminal hole formed in the case, a connection terminal projected via the terminal hole and a connector clip for electrically connecting the connection terminal with the electronic parts provided in the case.

The connector unit 200 may be formed in a surface of the rear case 102 at a location which is not exposed when the mobile terminal is used. For example, when the rear cover 103 is coupled to the rear case 102, the connector unit 200 may be covered by the rear cover 103.

According to one embodiment, the connector unit 200 is configured to connect a demountable electric device and electronic parts provided in the demountable electric device. Referring to FIG. 4, it is shown that the connector unit 200 may be connected with the short range wireless communication antenna 214. However, other devices may be mountable or demountable from the connector unit 200.

The short range communication antenna 241 is configured to wireless-communicate with an external device. The short range wireless communication antenna 241 according to this embodiment is attached to the rear cover 103. The short range wireless communication antenna 214 attached to the rear cover 103 may have less radio interference and installed in a small area, compared with a short range wireless communication antenna provided in the case.

When the rear cover 103 is coupled to the rear case 102, the short distance communication antenna 214 is connected with a connection terminal of the connector unit 200 to transmit and receive a signal to and from the electronic parts provided in the case.

Figure 5:
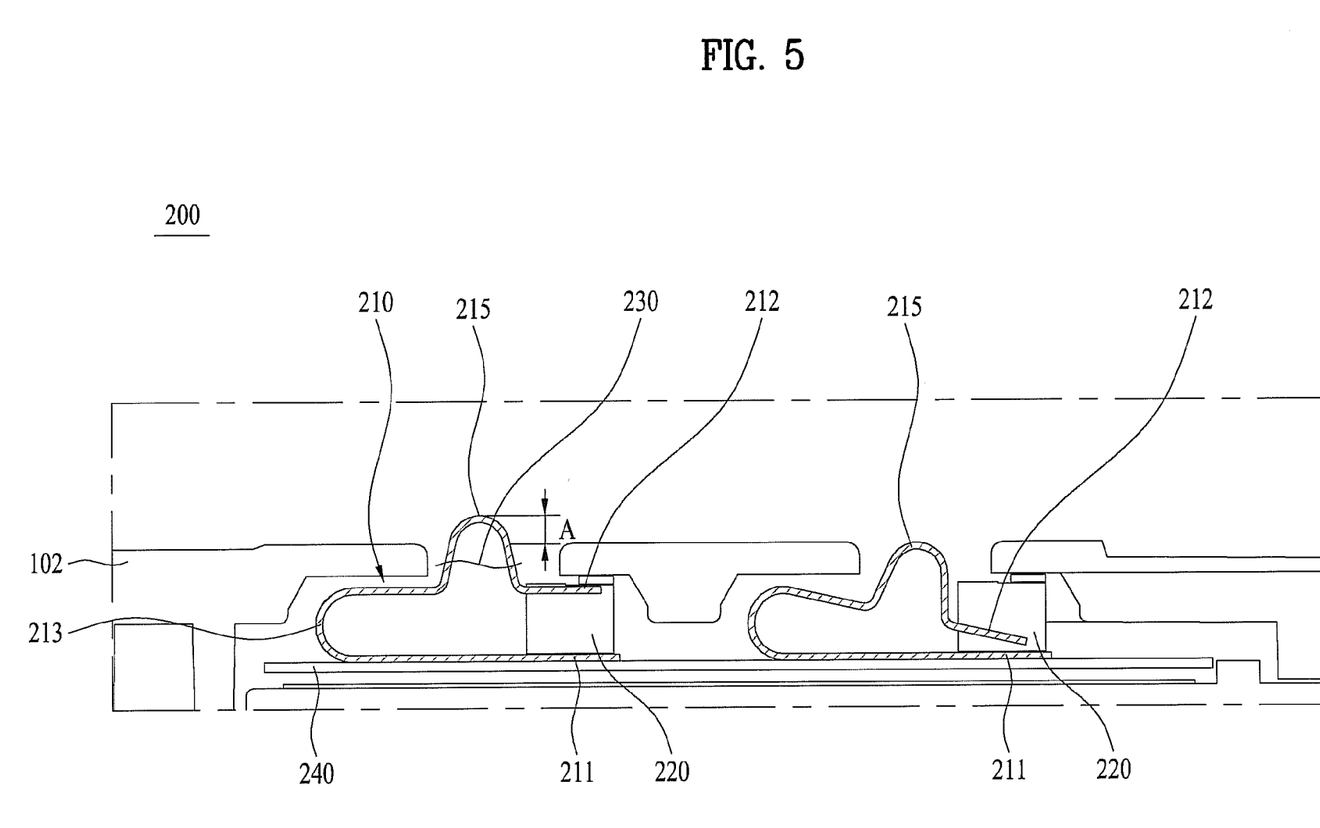
FIG. 5 shows a sectional view of one embodiment of a connector unit of the mobile terminal.
Figure 6:
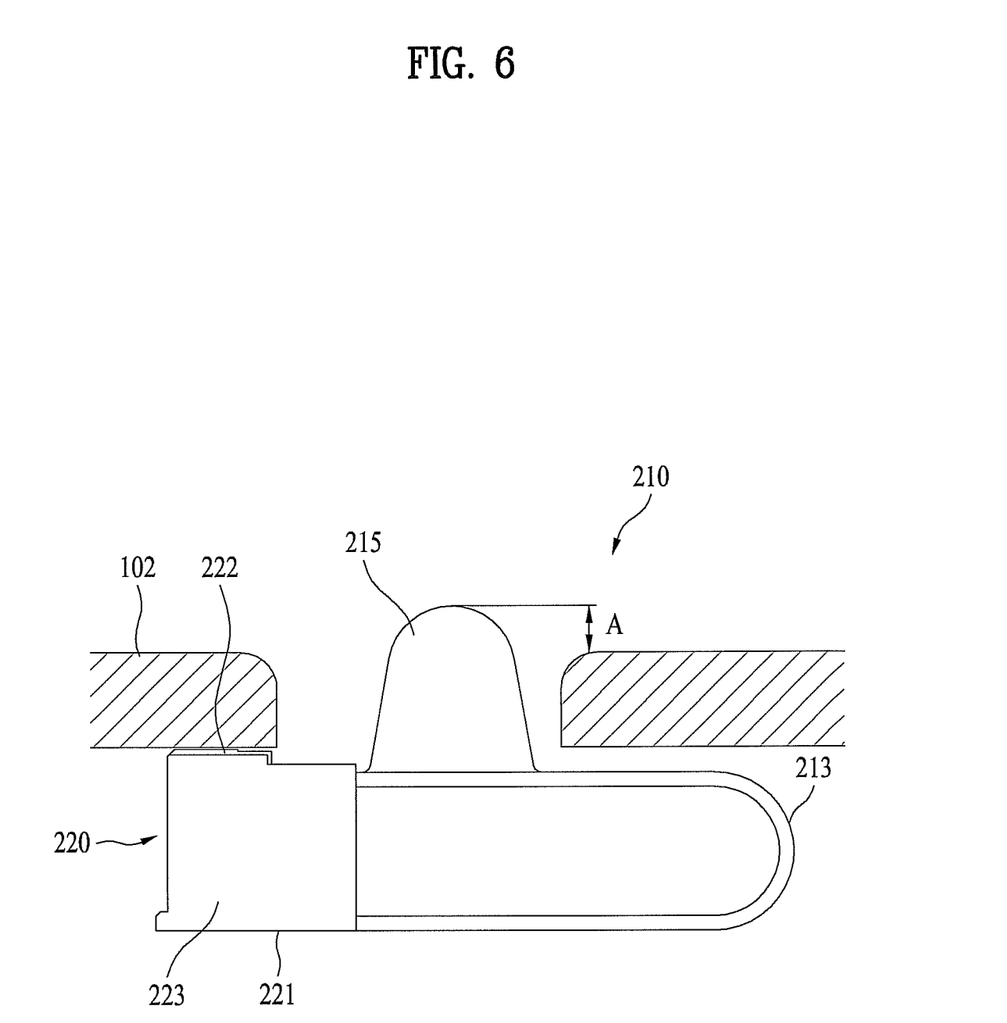
FIG. 6 shows a side view of the connector unit.
Figure 7:
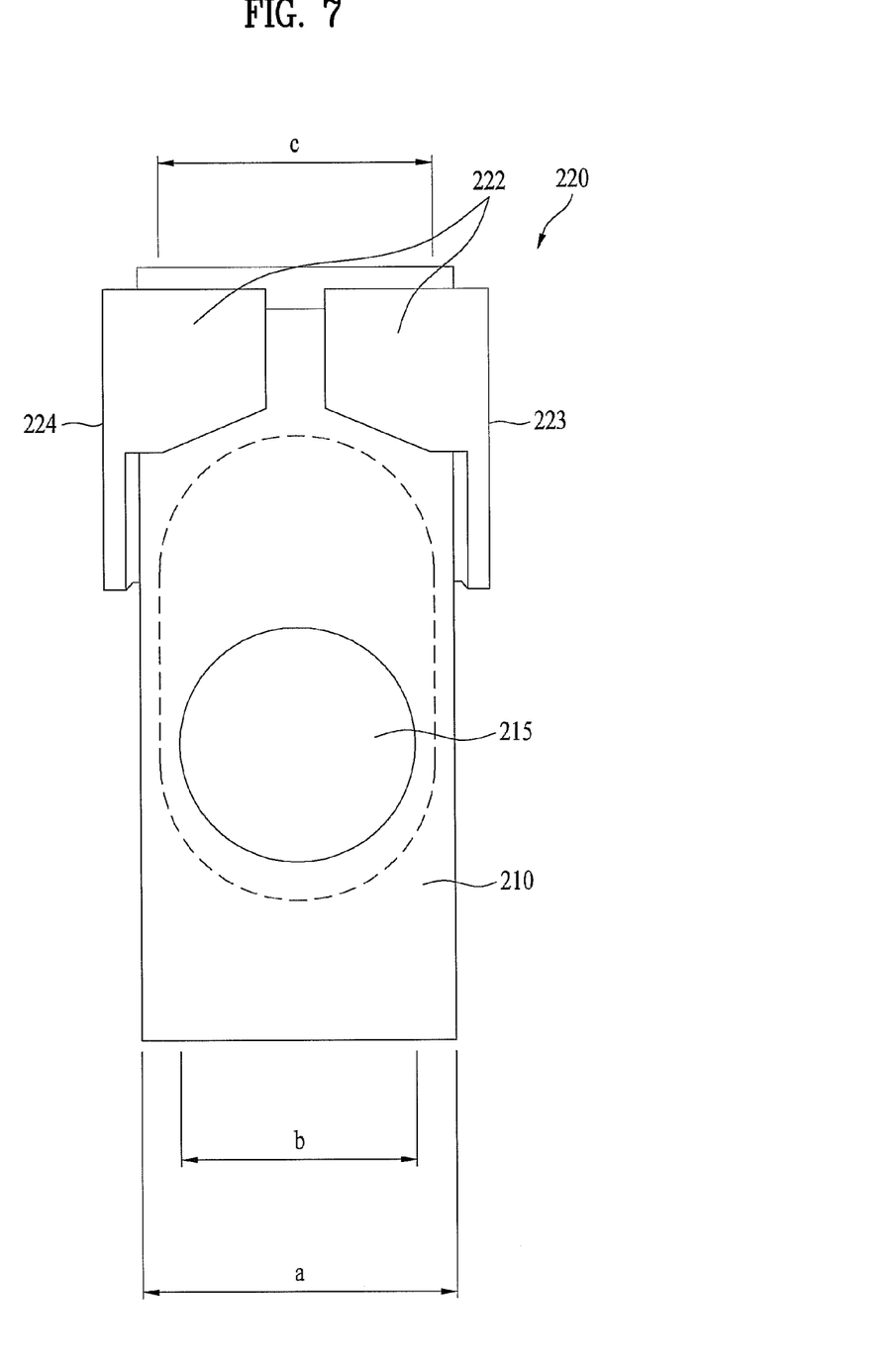
FIG. 7 shows another view of one embodiment of the connector unit.

Referring to FIGS. 5 to 7, the short range communication antenna 214 and connector unit 200 in mobile terminal 100 according to one embodiment. FIG. 5 shows an example of a side sectional view of the connector unit, FIG. 6 shows an example of a side view of the connector unit, and FIG. 7 shows a plane view of the connector unit.

In accordance with one embodiment, the case 102 of mobile terminal 100 has a predetermined space to mount electronic parts 240 therein, a terminal hole 230 in a rear surface of the case 102, and a connection clip 210. The connection clip may be disposed between electronic parts 240 and case 102 and may have a curved middle portion formed in substantially a "C" shape. The clip includes a first end 211 electrically connected to electronic parts 240 and a second end 212 covering or adjacent to terminal hole 230. Also included is a connection terminal 215 coupled to the second end 212 of the connection clip 210 which projects outside via the terminal hole 230.

As mentioned above, the case includes a front case defining a front surface of the mobile terminal 100 and a rear case covering a rear surface, and the front and rear cases may be formed in any areas of the case. According to this embodiment, the connection unit 200 may be formed in a surface of the rear case 102 covering the rear surface of the mobile terminal 100.

The connection unit 200 may include a clip holder 220 in addition to connection clip 210 and a connection terminal 215. The terminal hole 230 may be formed in the rear case 102 to partially expose the connection unit 200 to the outside.

The connection clip 210 has the curved portion 213 formed by curving a middle or intermediate portion of a longitudinally extended plate member in substantially a "C" shape or some other curved shape. The first end 211 and the second end 212 of the connection clip 210 are may be oriented in the same direction by the curved portion in an overlapping relationship.

The curved (or bent) portion 213 has elasticity and a separation distance between ends 211 and 212 may be changed by the force applied to the connection terminal 215. This may occur, for example, when cover 103 is attached to the terminal. When the force applied to the connection terminal 215 is removed, the first end 211 and the second end 212 may return to original positions and the distance between the first end 211 and the second end 212 is recovered.

According to one example, the distance (A) between the ends when the connection terminal 215 is pressed should be smaller than a transformable range of the curved portion 213. In other words, the connection terminal 215 is pressed as far as the height (A) of the projected portion and the projected height (A) of the connection terminal 215 should be within the transformable range of the curved portion 213.

When coupling the rear cover 103, the connection terminal 215 is pressed to be inserted in the terminal hole 230. If the projected height (A) of the connection terminal 215 is larger than the transformable range of the curved portion 213, the connection terminal 215 is projected higher than the surface of the rear case 102 when the rear cover 103 is coupled to the rear case and the rear cover 103 might come off the rear case 103.

The connection clip 210 is positioned between the electronic parts 230 and the rear case 102. According to this embodiment, the electronic parts 230 may be a printed circuit board (PCB). The first end 212 of the connection clip is seated on the PCB 230 to transmit and receive an electric signal to and from the PCB 230. The second end 212 of the connection clip is positioned under the terminal hole 230 and the terminal hole 230 is covered by the connection clip 210 within the rear case 102.

The terminal hole 230 covered by the connection clip 210 is completely covered by the connection clip 210 when the first end 211 and the second end 212 of the connection clip 210 are spaced apart without the force applied to the connection terminal 215.

The connection terminal 215 is formed in the second end 212 of the connection clip. Referring to FIGS. 5 to 7, the shape of the connection terminal is a member having a projection projected outwardly from the inside of the case 102. The connection terminal may be accessed to a radio frequency communication antenna 214 to receive an input signal.

The connection terminal 215 is vertically moved by the elasticity of the connection clip 210. The connection between the connection terminal 215 and the short range wireless communication antenna 214 may be maintained by the force upwardly applied to the connection terminal 215 by the elasticity of the connection clip 210.

There is a technical characteristic of the present invention in the size of the connection terminal 210. As shown in FIG. 7, the width (b) of the connection terminal 215 is smaller than the width (a) of the connection clip 210. The width (c) of the terminal hole 230 is larger than the width (b) of the connection terminal 215 and smaller than the width (a) of the connection clip 210.

According to one embodiment, the width may correspond to the perpendicular distance with respect to the extended direction from the curved portion of the connection clip 210.

According to one embodiment, the width (b) of connection terminal 215 is smaller than width (a) of the connection clip 210, and width (c) of the terminal hole 230 may be smaller than width (a) of the connection clip 210. In one embodiment, the terminal hole 230 may be covered by the connection clip 210 completely. Accordingly, the electronic parts may not be exposed via the terminal hole 230. As a result, external parts of the mobile terminal may be protected safely and the durability of the external parts may be enhanced. In addition, the beauty of the mobile terminal 100 may be enhanced.

The connection terminal 215 may be formed of an auxiliary member attached to the connection clip 210 or by the second end 212 of the connection clip partially projected. When the connection terminal 215 is projected from the connection clip 210, a circular cross sectional shape of the connection terminal 215 is easier to work and the present invention is not limited thereto.

Returning to FIG. 5, the connection terminal 215 may be inserted in the rear case 102. The connection terminal 215 may move, for example, in an arc with respect to the curved portion 213 of the connection clip 210, such that the connection terminal may be inserted in the terminal hole 230, sided toward a reverse direction of the curved portion formed in the connection clip 210.

In other words, as shown in FIGS. 5 to 7, the terminal hole 230 is more extended longitudinally to the second end of the connection clip from the position of the connection terminal when the connection terminal 215 is projected. That is to prevent the connection terminal 215 from colliding against the terminal hole 230 when the connection terminal 215 is inserted in the terminal hole 230.

When the cross section of the connection terminal 215 is circular, the shape of the terminal hole 230 may be oval.

The connection clip 210 may be transformed as shown in FIG. 6 when the rear cover 103 is coupled to the rear case 102. The connection terminal 215 shown in FIG. 6 is inserted in the rear case 102, getting inclined toward the first end 211 of the connection clip 210.

Considering such the movement of the connection terminal 215, the length of the terminal hole 230 is formed larger than the size of the connection terminal 215. Especially, the connection terminal 215 is inclined toward the first end 211 of the connection clip 210 and it is preferable that the terminal hole 230 is more extended toward the first end 211 of the connection clip. Referring to FIGS. 4 to 7, the terminal hole 230 may be formed longer toward the first end 211 of the connection clip.

The cross section of the connection terminal 215 may be circular. The second end 212 of the connection clip is pressed by a sharp material to form the connection terminal 215. As mentioned above, the width of the connection terminal 215 is formed smaller than the width of the connection clip 210. At this time, the terminal hole 230 may be formed in an oval shape corresponding to the oval shape of the connection terminal 215, as shown in FIG. 7.

The clip holder 220 may be coupled to the ends of the connection clip 211, 212 to limit the maximum distance between the first end 211 and the second end 212 of the connection clip.

Also, the clip holder 220 may be formed in a rectangular shape including a first surface in contact with a lower surface of the first end 211 of the connection clip, a second surface in contact with an upper surface of the second end 212 of the connection clip, and third and fourth surfaces for connecting the first and second surfaces with each other at side of the connection clip 210, having a predetermined height corresponding to the maximum distance between the first end 211 and the second end 212 of the connection clip.

The clip holder 220 may be formed of a single curved plate member. Referring to FIGS. 5 to 7, one plate member is curved and covering the first end 211 of the connection clip, and ends of the plate member forming the clip holder 220 meet each other at the upper surface of the connection clip 210.

In accordance with one embodiment, a V-shaped or U-shaped recess may be formed in the clip holder 220 along the direction of the connection terminal 215. That is a design considering the terminal hole 230. In order to prevent the clip holder 220 from being exposed to external view through terminal hole 230, the clip holder 220 may be cut away or otherwise dimensioned for location so as not to be exposed via the terminal hole 230.

Moreover, when inserted via terminal hole 230, the connection terminal 215 may be inclined toward the second end 212 of the connection clip 210. At this time, the connection clip 210 may prevent the connection terminal 215 from being hooked.

As mentioned above, the connection terminal 215 is accessed to the short range wireless communication antenna 214. The short range communication antenna 214 is a device to wireless-communicate with an external device. When it is attached to the rear cover 103 as shown in FIG. 3, the short range wireless communication antenna 214 has less frequency interference and can be installed in a small area, compared with a short range wireless communication antenna 214 provided in the case.

Especially, the short range communication antenna 214 for NFC (Near Field Communication) may be installed to the rear cover 103. The NFC is a short range communication technology for providing data communication between devices that is a kind of RFID (Radio Frequency Identification). The NFC is the communication technology having a writing function as well as a reading function so as to be used in a transportation card, a door lock, a book card, a credit card, and it is important to expand utilization of the mobile terminal 100.

Such the NFC performs communication when a user contacts with a mobile phone to a reader. Accordingly, the short range wireless communication antenna 214 may be installed in the rear cover an area of the rear cover 103. The short range wireless communication antenna 214 transmits and receives a signal to and from the electronic parts of the mobile terminal 100, to control the function of the NFC and to enable the user to check the performances implemented according to the NFC.

In accordance with one embodiment, the connection unit includes the terminal hole formed in the case to prevent the electronic parts within the case from being exposed outside. Accordingly, the internal electronic parts may be prevented from being contaminated by water or foreign substances.

Furthermore, the electronic parts provided in the case may not be seen from outside and the size of the connection terminal is smaller than the size of the conventional connection terminal. Accordingly, the mobile terminal having the neat and stylish design may be provided.

In accordance with another embodiment, a mobile terminal comprises a case including a hole; a cover coupled over the case; a connector terminal which extends through the hole in the case, and a connector support coupled to the connector terminal, wherein the cover includes an inner surface coupled to a circuit and wherein the connector terminal is electrically coupled to the circuit when the cover is coupled over the case.

The connector terminal has a first size, the hole in the case has a second size, and the connector support has a third size, wherein the third size is greater than the second size and wherein the second size is greater than the first size.

The connector terminal moves to first position when the cover is removed from the case and moves to a second position when the cover is coupled to the case, and wherein the first position is above a surface of the case by a predetermined amount and wherein the second position is lower than the first position. The connector support moves to allow the connector terminal to move between the first and second positions.

The connector support includes a first end coupled to the connector terminal, a second end which is spaced from the first end, and an intermediate section between the first and second ends. The intermediate section is curved and may have a substantially a C-shape. The first and second ends overlap.

The connector terminal and support completely overlap the hole in the case, so that no portion under the connector support and terminal is visible through the hole. The circuit is an antenna circuit and the antenna circuit is a short-range antenna circuit.

In accordance with another embodiment, a mobile terminal comprises a cover; a case including a hole; and a connector to be electrically coupled to a circuit between the case and cover, wherein the connector moves to a first position through the hole when the cover is coupled to the case and the connector moves to a second position when the cover is removed from the case, and wherein an area of the connector is greater than an area of the hole.

The connector moves through the hole to a first height above an upper surface of the case when the cover is removed, and wherein the connector moves to a second height lower than the first height when the cover is coupled to the case.

The connector includes a terminal and a clip coupled to the terminal, wherein the clip defects under pressure from the cover to move the terminal to the first position when the cover is coupled to the case and the clip moves the terminal to the second position when the pressure is reduced as a result of the cover being removed from the case. A height of the terminal is greater than a difference between the first position and the second position.

The clip has a first end coupled to the terminal, a second end spaced from the casing, and an intermediate section between the first and second ends, and wherein the first end overlaps the second end. The second end is coupled to a support surface and the first end is free to move in order to allow the connector to move between the first and second positions.

The area of the connector being greater than the area of the hole prevents any location under the connector from being visible through the hole in the case. The circuit is an antenna circuit and the antenna circuit is a short-range antenna circuit.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of one embodiment may be combined with the features of one or more of the other embodiments.

Although embodiments have been described with reference to a number of illustrative embodiments, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A mobile terminal comprising:
a case including an oval shape hole and a space in which an electronic part is loaded;
a cover detachably coupled over the case;
a connector terminal having a circular cross section that extends through the hole in the case;
a connector support including a first end coupled to the electronic part, a second end that is spaced from the first end and is coupled to the connector terminal, and a curved intermediate section between the first end and the second end, and
a clip holder contacting the first end and the second end of the connector support to limit a maximum distance between the first end and the second end of the connector support, wherein:
the cover includes an inner surface coupled to a circuit, and
the connector terminal is electrically coupled to the circuit when the cover is coupled over the case,
wherein a width of the oval shape hole is shorter than a length of the oval shape hole,
wherein the connector terminal has a first width size, the hole in the case has a second width size, and the connector support has a third width size,
wherein the third width size is greater than the second width size, and the second width size is greater than the first width size, and wherein the clip holder is formed of a single curved plate member and has a V-shaped or U-shaped recess along a direction of the connector terminal.

2. The mobile terminal of claim 1, wherein the connector terminal moves to a first position when the cover is removed from the case and moves to a second position when the cover is coupled to the case, wherein the first position is above a surface of the case by a predetermined amount, and wherein the second position is lower than the first position.

3. The mobile terminal of claim 1, wherein the intermediate section has substantially a C-shape.

4. The mobile terminal of claim 3, wherein the first and second ends overlap.

5. The mobile terminal of claim 1, wherein the connector terminal and the connector support completely overlap the oval shape hole in the case, so that no portion under the connector support and the connector terminal is visible through the oval shape hole.

6. The mobile terminal of claim 1, wherein the circuit is an antenna circuit.

7. The mobile terminal of claim 6, wherein the antenna circuit is a short-range antenna circuit.

8. A mobile terminal comprising:
a cover;
a case including an oval shape hole and a space in which an electronic part is loaded;
a connector to be electrically coupled to a circuit between the case and the cover, the connector including a first end coupled to the electronic part, a second end that is spaced from the first end and a curved intermediate section between the first end and the second end, and
a clip holder contacting the first end and the second end of the connector to limit a maximum distance between the first end and the second end of the connector,
wherein the connector moves to a first position through the hole when the cover is coupled to the case and the connector moves to a second position when the cover is removed from the case, and wherein an area of the connector is greater than an area of the hole,
wherein the clip holder is formed of a single curved plate member and has a V-shaped or U-shaped recess along a direction of the connector terminal, and
wherein the area of the connector being greater than an area of the hole prevents any location under the connector from being visible through the hole in the case.

9. The mobile terminal of claim 8, wherein the connector moves through the hole to a first height above an upper surface of the case when the cover is removed, and wherein the connector moves to a second height lower than the first height when the cover is coupled to the case.

10. The mobile terminal of claim 8,
wherein a clip defects under pressure from the cover to move the terminal to the first position when the cover is coupled to the case and the clip moves the terminal to the second position when the pressure is reduced as a result of the cover being removed from the case.

11. The mobile terminal of claim 10, wherein a height of the terminal is greater than a difference between the first position and the second position.

12. The mobile terminal of claim 8, wherein a clip has a first end coupled to the terminal, a second end spaced from the casing, and an intermediate section between the first and second ends, and wherein the first end overlaps the second end.

13. The mobile terminal of claim 12, wherein the second end is coupled to a support surface and the first end is free to move in order to allow the connector to move between the first and second positions.

14. The mobile terminal of claim 8, wherein the circuit is an antenna circuit.

15. The mobile terminal of claim 14, wherein the antenna circuit is a short-range antenna circuit.

\* \* \* \* \*